Figure 1:
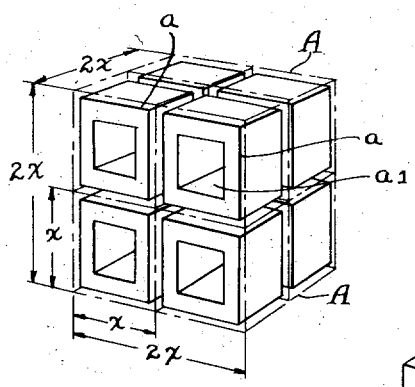

Nov. 9, 1926. Re. 16,468

F. T. HEATH

HOLLOW BUILDING BLOCK AND SYSTEM OF WALL CONSTRUCTION

Original Filed April 4, 1923 3 Sheets-Sheet 1

Inventor

Frederick T. Heath

By Bates, Macklin, Golrick & Teare

Attorneys

Nov. 9, 1926 Re. 16,468

F. T. HEATH

HOLLOW BUILDING BLOCK AND SYSTEM OF WALL CONSTRUCTION

Original Filed April 4, 1923 3 Sheets-Sheet 2

Inventor

Frederick T. Heath

By Bates, Macklin, Bolrick & Teare

Attorneys

Nov. 9, 1926. Re. 16,468

F. T. HEATH

HOLLOW BUILDING BLOCK AND SYSTEM OF WALL CONSTRUCTION

Original Filed April 4, 1923 3 Sheets-Sheet 3

Inventor

Frederick T. Heath

By Bates, Macklin, Bolrick & Teare.

Attorneys

Reissued Nov. 9, 1926.

Re. 16,468

UNITED STATES PATENT OFFICE.

FREDERICK TWICHELL HEATH, OF COLUMBUS, OHIO.

HOLLOW BUILDING BLOCK AND SYSTEM OF WALL CONSTRUCTION.

Original No. 1.544,577, dated July 7, 1925, Serial No. 629,818, filed April 4, 1923. Application for reissue filed September 2, 1926. Serial No. 133,270.

This invention relates to a system of wall construction, and as a basis of the system, the invention involves the creation of a hollow building block or tile having certain fundamental characteristics of proportions and shape, whereby all the known requirements and desirable features of hollow load bearing wall construction may be fulfilled. The requirements of hollow wall constructions and the ideal attainment contemplates economy of manufacture, the ease in burning, facility of shipment, convenience of placement in the wall structure for definite thicknesses of walls as well as at offsets, corners, jambs, pilasters and the like. Furthermore, these conditions must be met by a block capable of maintaining universal vertical alignment of the webs and shells of the blocks throughout all parts of the wall. A wall built in accordance with my invention will have the advantage of the added strength obtained by the multiple bonding arrangement between the blocks in alternate courses. The bond is effected between equal surface portions of adjacent blocks resulting in a bond of maximum strength which could not be obtained were the bonding portions of unequal area. The use of a cubical block assures a perfect and continuous bond regardless of the side upon which the block is laid. The fact that a cubic element is used as a basis of the wall structure facilitates the bond between equal portions, while permitting the use of even fractions of the cube unit forming the end closures, jams, offsets, pilasters and corners.

By the present invention, I am enabled to accomplish all of these and other objects and advantages by the use of a simple easily manufactured, and conveniently handled voided block designed upon a mathematical principle such that it may be divided into parts and used in multiples of its parts or of itself with the voids either horizontal or vertical, and with the greatest convenience and without sacrificing capability of carrying the greatest possible load which the mortar itself in the wall will sustain.

In carrying out this invention, I have analyzed all these requirements and by the use of a fundamental principle have made a composite block of uniform hollow elements integrally connected and of such size and relationship that all the conditions and requirements for this character of load bearing hollow masonry are fulfilled.

Figure 2:
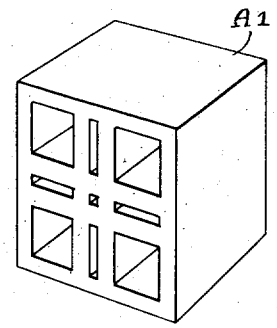
Figure 11:
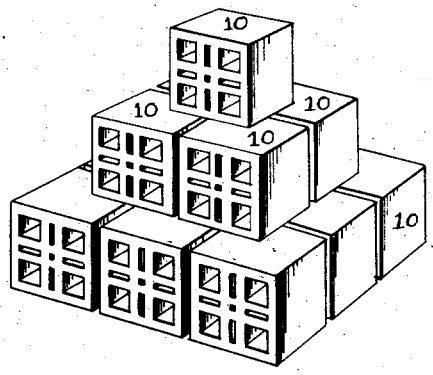
Figure 7:
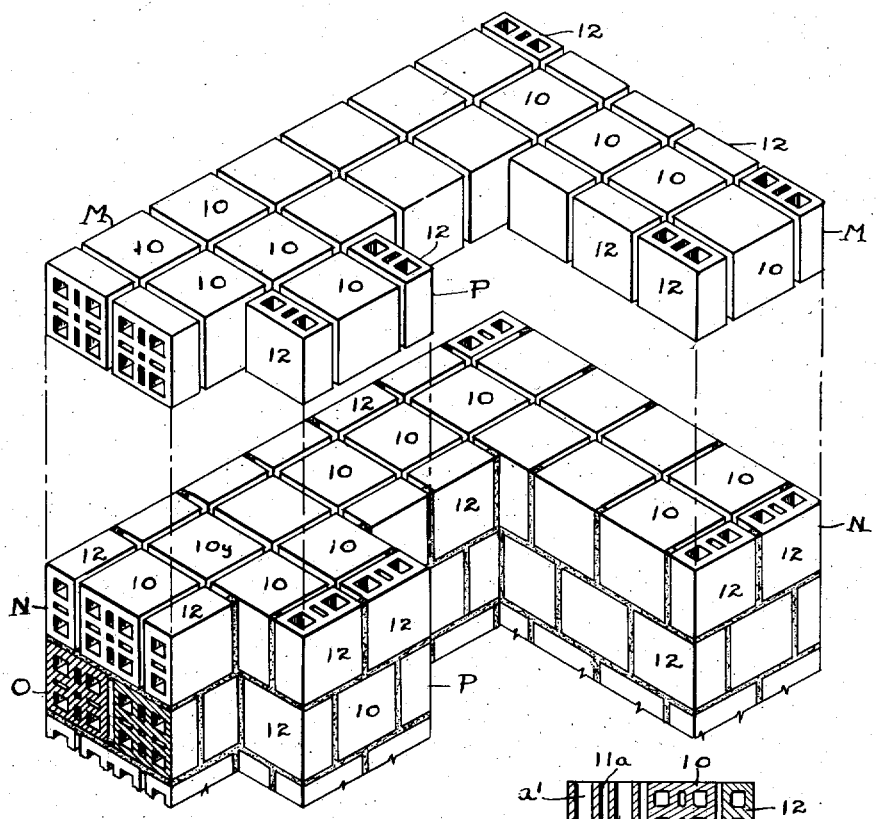
Figure 3:
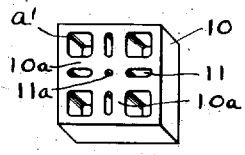
Figure 4:
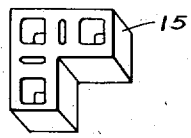
Figure 10:
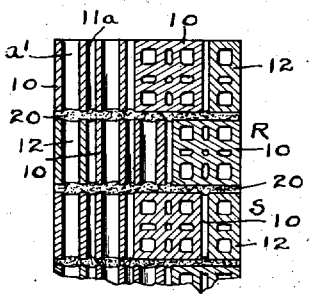
Figure 5:
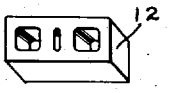
Figure 6:
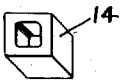
Figure 8:
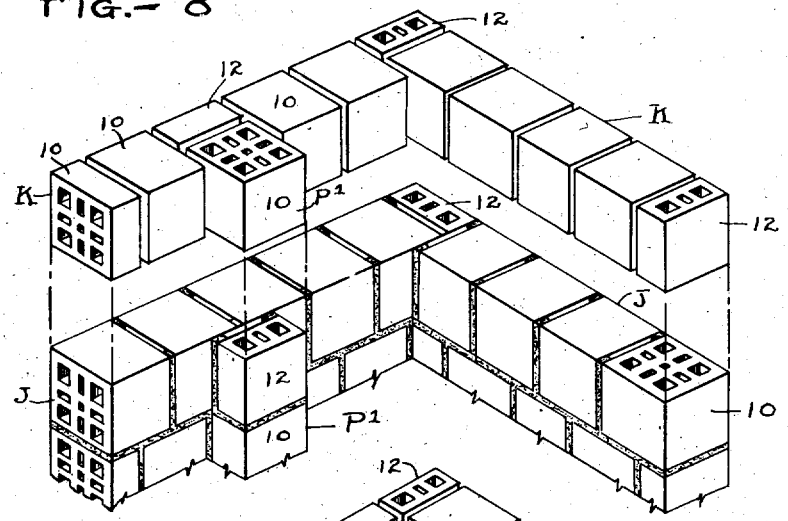
Figure 9:
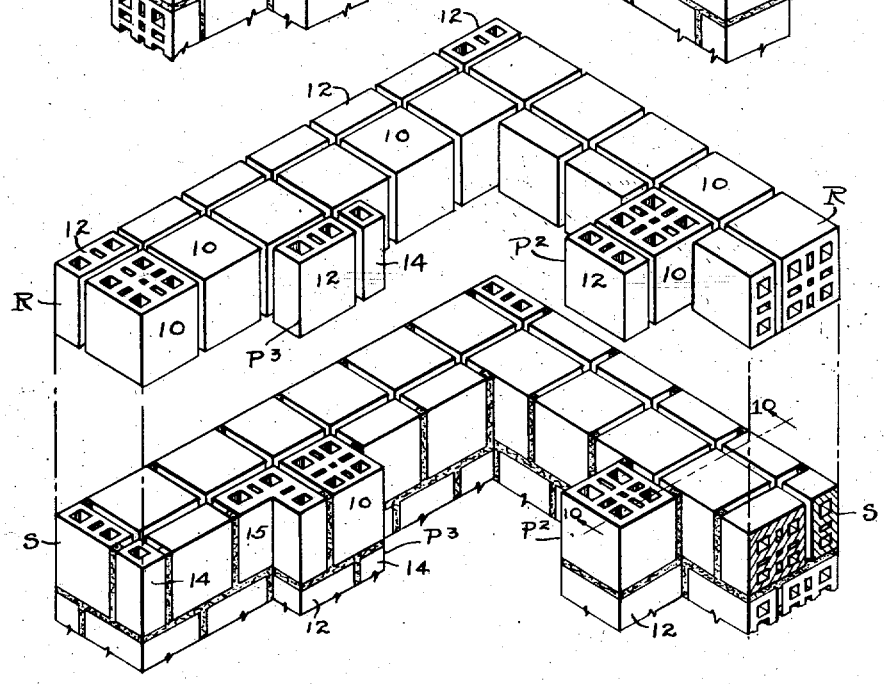

In the drawings, Fig. 1 is a diagrammatic view illustrating a concept of a multiple of a cubic unit; Fig. 2 illustrates these units in a theoretical block with the walls of these cubes integrally connected while maintaining the ideal ratios; Fig. 3 is in embodiment of the block of Fig. 2 in a practical form of block; Figs. 4, 5 and 6 illustrate practical embodiments of a three quarter, half and a quarter cube, respectively, of the composite block; Fig. 7 is a perspective view of several courses of a wall constructed of the block possessing various characteristics of which the present invention is capable, the uppermost course of the wall being raised for clearness of illustration; this view showing a wall of a thickness of twice that of the composite unit block; Fig. 8 is a similar view showing the wall construction comprised essentially of a single thickness of units; Fig. 9 is a similar view illustrating a wall of one and one half units thickness; Fig. 10 is a vertical section through a wall and pilaster as at the line 10—10 of Fig. 9; Fig. 11 is a diagrammatic view illustrating the pyramid bond effect of which this block is capable.

Referring particularly to Fig. 1, to illustrate the designing of the composite unit, assume first that a block in the form of a cube is desired, as obviously it may then take any position in the wall. Now the volume of the cubic space which such a block will occupy in the wall is slightly greater than the block itself, because of the thickness of the mortar which may be placed upon any or all of its surfaces. The composite cubical unit which is to occupy the theoretical cubic space in the wall is designed upon basic elements in the form of cubes. I, therefore, conceive a theoretical cubic element $a$, consisting of a hollow square, that is having a void $a'$. Now because the composite block is smaller by the thickness of one mortar joint or bed, which may be upon any face, this element is correspondingly smaller than its proportion of the theoretic cube of the composite block. A most convenient size will allow the use of a base cube element about the width of an ordinary brick and eight of these cubes would comprise the composite cube. To make these elements into a block of practical form requires that the walls or shells of the elements be continued and integrally connected. When this is done, the result is the block A′ shown in Fig. 2, showing the side walls of all the base cube elements joined, with the result that the voids extend clear through the larger element, and it has four complete sides surrounding these longitudinal voids. Further inspection of Fig. 1 will show that any surface of the cube may be considered as being divided into four equal square bonding areas which are in fact the separate and single outer surfaces of the small cubic elements *a*. These four square units are equal in size and are spaced apart by a cross-shaped area, each arm of the cross having a width equal to the thickness of a mortar joint.

To make this relationship clear, we may assume that a theoretical cube A be divided into smaller cubes, each having a dimension of $x$. The larger cube has then $2x$ for each of its three dimensions, while the actual composite block has a dimension of $2x$ minus the thickness of a mortar bed or joint.

For practical purposes, the composite block may be extruded from a die continuously, the elements being cut by a moving wire as is usual from a column of clay so formed, into lengths equivalent to the other dimensions of the block. The corners where the webs and shells meet are rounded to prevent cracking during the burning of the ware in the kilns and also to facilitate the use of suitable dies through which the clay may be extruded.

Designating the finished block of Figs. 3, 10, we may note that its four outer walls are braced by double cross webs $10^a$, continuous through the block and joining near the center of the block, being separated by voids 11, and a small central void $11^a$, and because this block still holds the relationship described in connection with Fig. 1, the void 11 corresponds to the thickness of a mortar joint, the advantage of which will presently appear in the illustrative walls.

The manner of division of the blocks may be by the use of double adjacent wires as the clay is extruded, so placed that the block 10 of Fig. 3 may be cut to form a three quarter block as shown in Fig. 4, or may be divided in two such half blocks as Fig. 5 or further divided into quarter blocks of Fig. 6, designated respectively 15, 12 and 14. By reason of the alignment of the voids 11, and $11^a$ therewith, a blow of a mason's hammer or trowel may divide or split one of the blocks 10 into its halves or quarters separating it between the webs $10^a$. This affords convenience in case the workman has not at hand the particular division he needs at the moment.

Among the considerations determining the dimensions of an ideal load bearing hollow building blocks are; that it may be used for walls varying in thickness by units of measure to which architects and builders are accustomed; that laws of various countries usually require hollow load bearing walls to have vertically aligned load bearing members, that is webs and shells, at stated intervals transversely throughout the wall; and it is necessary that the multiple unit be of such size that walls may be laid very rapidly and yet the blocks may be not too large to be easily handled by the workmen. All of these conditions may be fulfilled by the selection for an elemental cube dimension substantially equivalent to the width of the standard brick. There are then two load bearing webs or shells for each brick width throughout the thickness of a wall. The dimension of the cube in any one direction being that of two brick widths plus a mortar joint. The dimension $x$ therefore may be considered as corresponding substantially to that of the width of a brick plus one mortar joint in common use in any particular locality. While such a dimension is merely illustrative, it is extremely practical because it permits the proportionate voiding of the composite block and allows proper thickness of the webs and shells of the block for practical requirements. The walls may then be built to vary in thickness by multiples of the dimension $x$. Thus a hollow wall of the thickness of $x$ may be laid up of half blocks or quarter blocks of Figs. 5 and 6. A wall of the thickness of $2x$ may be laid up of full blocks. The walls having a thickness of $3x$, $4x$, etc., may include whole blocks and its divisions with the desirable cross bonds. Such walls are illustrated in Figs. 7 to 9. It is clear that as these walls are shown, a wall such as in Fig. 7 will be one mortar joint thickness less than exactly the distance $4x$, because there is always one mortar joint less than the number of bare cubes transversely of the wall.

Referring particularly to Fig. 7, I have here shown a wall construction having the thickness of $4x$, and having load bearing characteristics by a vertical alignment of the webs and I have accomplished closed voids, transverse and longitudinal bonds, etc. The upper raised course is designated M, shown in this position to illustrate its relationship to the blocks in the course below. It will be noted that this course at the left consists of two series of blocks 10 laid to bring the voids horizontally and these voids are closed at the corner end by two half blocks 12, one shown with its voids vertically and the other with its voids horizontally. The right hand portion of this course consists of a central series of blocks 10 with the voids horizontally, at each side of which is a series of blocks 12 with the voids horizontally while an end may be formed by turning the central block so that its voids run transversely of the wall and the two blocks 12 with their voids vertically. A pilaster construction is illustrated at P, wherein the upper course, a block 10, is interposed between two upended halves 12 with its voids running parallel to the wall and the method of bonding these blocks to the wall appears when the course below is examined. This pilaster, it will be seen, has a dimension $2x$ projecting outwardly from the wall and a width of $4x$. The transverse bonding between adjacent courses appears when it is noted that at the left of the view the course N consists of a middle series of blocks 10 at each side of which are half blocks 12. At the corner a block 12 is turned at right angles to the corresponding corner blocks of the course above. In forming the corner the crossing of webs and shells in the blocks forming the lower course by those in the blocks forming the upper course is minimized by placing all of the blocks 10 in the middle series so that the voids run in the direction of the series.

Noting the pilaster construction, it will be seen that the inner series of half blocks 12 is interrupted by two full blocks 10 bonded by the blocks 10 and 12 above and below, over-lapping the two blocks 10 and projecting into the wall a distance of $x$ and outwardly therefrom, while to complete the pilaster for this course, two half blocks 12 are used.

In the end construction at the right, two half blocks close the longitudinal voids of the double row of blocks 10. The blocks 12 are bonded by overlapping portions of the blocks 10 and 12 above and below, while the corners are completed as before.

Attention is called to the fact that at the corners, pilasters, and all similar places, where portions of the blocks are used they are not only bonded into position by a perfect pyramidal bond but the webs and shells thereof lie in true vertical planes and webs and shells of blocks above and below. This is particularly clearly shown at the left of this figure when it is noted that the course O corresponds with the course M and in the sectional showing it can be noted that blocks 10 extend over half of the area of a half block 12, and that a transverse bond through the wall is effected. It is not to be inferred that only a transverse bond is effected, but it will be seen that the block 10 lies between equal portions which are described above as the outer surfaces of the cubic elements and is bonded with these equal portions above and below. The vertical center line of the block 10, regardless of the position in which it is laid, lies in the line of intersection of the vertical mortar joints. The simplicity of starting and finishing courses in a manner to effect this so-called running bond is apparent, for example the course M will be started by two half blocks 12 with the voids vertically and a block 10 with voids transversely of the wall while the course below would be started by vertical halves as shown.

A more simple construction is shown in Fig. 8 where the course K consists of blocks 10. Except at the corners and pilaster, this wall has a thickness of one composite unit, or $2x$, as in each case, minus a mortar joint thickness. The corner is formed by half block 12 and the end similarly formed as shown at the right, while the course J below, is the same except that at its corner, the half block 12 is turned into the opposite direction to allow for the overlapping of the blocks 10 to provide the running bond and at the end at the right a full block 10 may be conveniently used as shown. The pilaster having a dimension $x$ by $2x$ (approximately) in the course J, consists of a block 12, shown with the voids vertical, while it is bonded into the wall above and below by blocks 10 extending into the wall.

In Fig. 9 I have shown an illustrative wall having a thickness of one and one half units (or $3x$ minus a mortar joint thickness). I have here illustrated a different manner of making pilasters and conveniently bonding them into the wall. Here the upper course R is shown at the right as consisting of a series of blocks 10 laid with the voids horizontal and closed at the corner by a half block 12, while at the inner side the half blocks 12 are laid with the voids horizontal.

Extending to the left from the corner, it is convenient to simply continue the outer series of half blocks, while the inner series is then made up of whole blocks 10; and end or corner blocks at the extreme left having the voids turned vertically. Transverse bond is effected as before by alternately placing the half blocks at the inside and outside of the wall. It also follows that alternately placing the half block at the inside and outside of the wall as shown results in a multiple bond between equal portions of bonding blocks, both longitudinally and transversely of the wall, so that a certain one quarter square interbonding unit of area is maintained common to all blocks.

Here is shown pilaster $P^2$ having a dimension of $2x$ by $2x$ (approximately as noted) bonded into the wall in the course R by whole blocks interrupting the half block series. Outside of this is a half block 12. In the course S the whole block simply stands outside of the series of blocks 10, the bonding being effected by the blocks 10 of the course R and the course below.

In the pilaster $P^3$ shown in the left part of the wall, one utility of the three quarter block 15 is illustrated as well as the quarter block 14. In this as in a few other instances, it is necessary to use the three quarter block if the perfect pyramidal bond idea to be later described is consistently carried out. The cross section of Fig. 10 illustrates clearly the transverse bonding effect of the pilasters, as well as the wall. It also emphasizes, by clear illustration, the vertical alignment of all load bearing members, that is, of webs and shells, in the body of the wall, as well as in the pilaster.

This ideal wall construction also carries out a theme of pyramidal bonding resulting from the composite block comprising a development of a multiple of elemental cubes as above described. Wherever a full block is used in a multiple thickness of wall, it overlaps both transversely and longitudinally of the course with an area of blocks above and below, the overlap being in any direction nearly a full distance of $x$. For example, the block designated for convenience $10y$ in the course N of Fig. 7 stands over adjacent corners of four blocks 10 below and stands under adjacent corners of four blocks 10 above.

To illustrate more clearly, the principle of the pyramidal bond accompanying bonding in both directions horizontally of a wall, I have shown in Fig. 11, a pyramidal pile of blocks 10.

It will be noted that the uppermost block rests upon four blocks 10 occupying an area on each of $x$ by $x$ (minus a one-half thickness of mortar joint in each direction). These four blocks in turn each rest upon four blocks below, occupying corresponding areas on each. When so positioned, it will be immaterial whether the voids are horizontal or vertical because in either instance, the voids 11 will stand over mortar spaces or joints between the blocks below. It will be clear that a wall the full thickness of either of these courses may be completed with the use of half blocks or whole blocks and that this pyramidal bond will be effected throughout.

It is obvious that, having established the theme of a composite block consisting of multiples of the units of an elemental hollow cube, this multiple may be any number of the dimension $x$, yet still accomplish many of the purposes of the present invention, but to accomplish this pyramidal bond and cause the block with its divisions to be the most unlikely to result in error in construction of walls, the composite block should be $2x$ by $2x$ by $2x$ with provision for mortar. A mason told that he must overlap the blocks in courses above and below in both directions needs no further instruction, because the present habits of masonry in all countries assures the results of the carrying out of the present invention. to the end of attaining all of the desirable characteristics of hollow wall construction without sacrificing the load bearing characteristics of the wall.

I claim:

1. A hollow building block, the edges of which define a cube, a shell forming four sides thereof, interior transverse double webs connecting the shell, the webs being spaced apart a distance equal to the thickness of a mortar joint, the block being thus divided into four units each square in cross-section and each of which is double the length of a side of a theoretical cube plus the mortar space, and the block capable of division into half, quarter or three-quarter portions by being subdivided through the mortar joint spaces.

2. A wall construction consisting of building blocks described in claim 1, in which all the blocks in the wall are set to have the shells of the cross sectionally square units thereof in load-bearing coincidence with the corresponding shells in the blocks of the courses above and below with some of the blocks laid to have the voids thereof extending vertically and other of the blocks laid with the voids extending horizontally.

3. A hollow load-bearing wall, consisting of building blocks all made from the same pattern and whose edges define a cube, the block shells having interior transverse double webs spaced apart a distance equal to the distance of a mortar joint, thus dividing the blocks into four cross sectionally square units, each being double the length of a side of a theoretical cube plus the mortor joint, the wall structure comprising such composite cubical blocks or divisions thereof being laid in even horizontal courses with the ends and corners and pilasters of the wall embodying whole blocks or block divisions with the voids thereof set vertically with every cubical element of the blocks having at least two walls in load bearing vertical alignment with the webs and shells of the blocks above and below and all the blocks being set in the wall in a pyramidal bonding relationship.

4. A hollow building block the edges of which define a cube and having an outer shell forming four sides thereof and interior transverse double webs connecting the shell walls, the webs being spaced apart a distance equal to the thickness of a mortar joint and forming with the shell a plurality of theoretical smaller cubes having the theoretic shell walls thereof joined by portions of the outer shell and of the transverse webs which portions are of a width corresponding to the thickness of a mortar joint.

5. A hollow load bearing building wall consisting of cubically formed building blocks comprising a four sided shell having two pairs of transverse interior webs, each pair connecting two opposite sides of the shell, and the web spacing being such that the blocks may be divided into quarter sections having side dimensions which are equal to one half the dimension of a cubical block minus one-half the thickness of a mortar joint, said blocks being laid in the wall in even horizontal courses, the blocks in one course overlapping full blocks in the adjacent courses above and below a distance equal to the side dimension of said quarter sections of the block and with every quarter part in the wall whether comprised in whole or half or quarter blocks having at least two shells or web members in vertical and load bearing alignment with corresponding members above and below.

6. In a wall structure composed of tile formed in cubes and fractions thereof, the surfaces of the cubes defining four square bonding units separated by the thickness of a mortar joint, all of the tile and fractions thereof being laid in the wall in horizontal courses with a common vertical dimension, the wall having a bond between tiles and fractions thereof in adjacent courses effected by the four bonding units in the surface of a cubical tile overlying four bonding units in a plurality of cubical tile or fractions thereof in the next course.

7. A hollow wall structure composed of voided blocks formed in cubes, half cubes and quarter cubes, said blocks being laid in horizontal courses and spaced apart the thickness of a mortar joint and wherein each cube between the top and bottom courses is interposed in diagonal offset bonding relation between equal square surface areas of other cubes above and below, each surface area being equal to the area of the end of a quarter cube block.

8. A hollow wall structure composed of voided blocks formed in cubes and half cubes, the blocks being similarly arranged with a common vertical dimension in alternate horizontal courses and spaced apart the thickness of a mortar joint, the cubical blocks in a course being laterally displaced substantially one half a cube thickness relative to the cubes in the adjacent course and also a longitudinally displaced substantially one half a cube thickness relative to the cubes in the said adjacent course.

9. A hollow wall structure composed of voided blocks formed of whole cubes, half cubes and quarter cubes, said blocks being laid with a common vertical dimension in each course and with some of the blocks having their voids extending horizontally and with each cubical block in the wall being interposed in diagonal offset bonding relation between surface areas equal to the end of one of the said quarter cubes and bonded with four other blocks above and below, said blocks being spaced apart the thickness of a mortar joint, the wall having end closures including cubical blocks and fractional blocks with the voids thereof disposed vertically, said fractional blocks being set to conform to the bonding relationship of the cubical blocks in the wall.

10. In a hollow wall structure composed of voided blocks formed in cubes and fractions thereof, with some of the blocks laid in the wall with their voids extending horizontally, said wall comprising horizontal courses of uniform height, having a greater thickness than the cube, and having the end closures formed of cubes and the said fractions thereof with the voids of the closure members disposed vertically.

11. A hollow wall structure composed of voided cubical blocks and lesser blocks, the wall having a thickness of odd multiples of the theoretical cube, the voids in the blocks extending both horizontally and vertically in the body of the wall and the end closures including the cubical blocks with the voids thereof disposed vertically.

12. A hollow wall structure composed of voided cubical blocks and voided half cubical blocks, the full cube surfaces each having four square bonding areas separated by the thickness of a mortar joint, four sides of the half cubes each having two such square bonding areas spaced apart the thickness of a mortar joint and the said cubes and half cubes being laid in the wall structure in horizontal courses with the common dimension measurable vertically and some of the blocks being laid with their voids extending horizontally, and with a running bond between alternate courses equal in both directions from the mortar joint, by reason of an overlap equal to the width of said square bonding areas, and the corners and ends of the wall closed with this uniform bonding relationship by the use of half and full cubes in alternate courses set with their voids vertical at such ends and corners.

Signed at Cleveland, county of Cuyahoga and State of Ohio, this 19th day of August, 1926.

FREDERICK TWICHELL HEATH.